Dec. 6, 1938.  W. D. COCKRELL  2,139,489

FREQUENCY RESPONSIVE RELAY

Filed Aug. 27, 1936

Inventor:
William D. Cockrell,
by Harry E. Dunham
His Attorney.

Patented Dec. 6, 1938

2,139,489

UNITED STATES PATENT OFFICE 2,139,489

FREQUENCY RESPONSIVE RELAY

William D. Cockrell, Schenectady, N. Y., assignor to General Electric Company, a corporation of New York Application August 27, 1936, Serial No. 98,190

5 Claims. (Cl. 250—41.5)

My invention relates to frequency responsive relays and particularly to photoelectric relays that are frequency responsive. One object of my invention is the provision of an improved relay of this character which is independent of the operation of moving parts. Another object is the provision of such a relay having means for varying the frequency at which the relay responds. A further object is the provision of such a relay which is of simple construction, efficient in operation and inexpensive to manufacture.

My invention will be better understood from the following description taken in connection with the accompanying drawing, and its scope will be pointed out in the appended claims.

Figure 1:
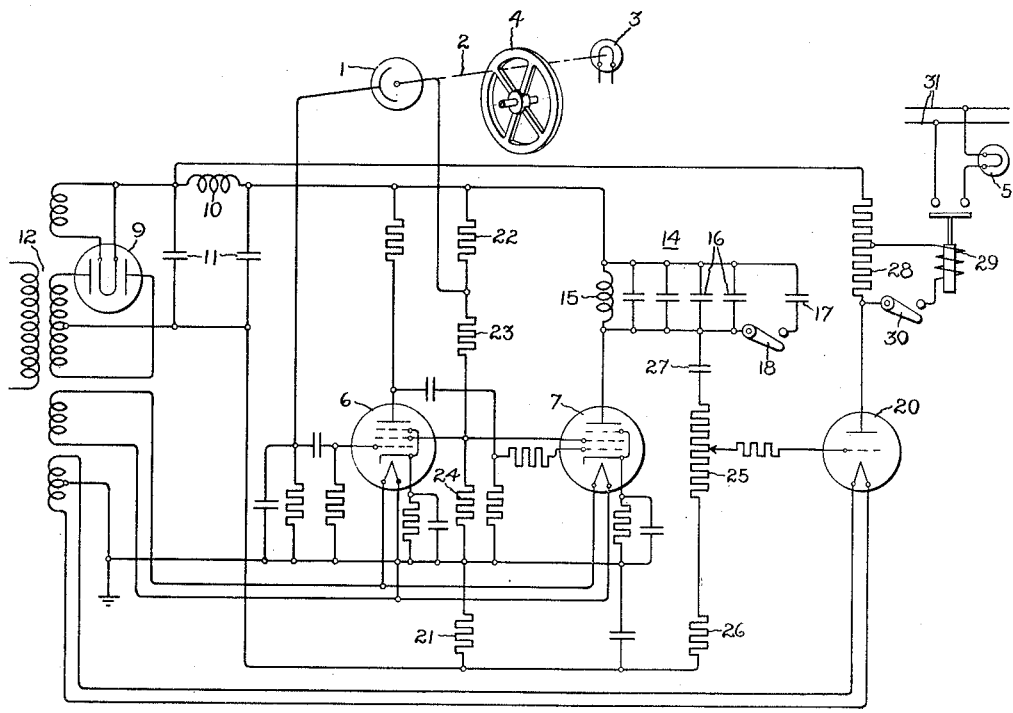
Figure 2:
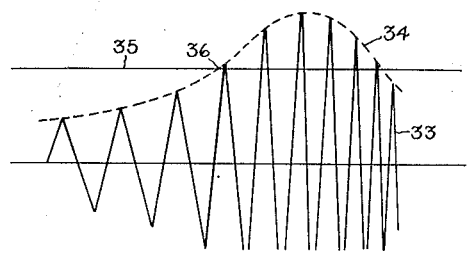

Referring to the drawing, Fig. 1 is a circuit diagram illustrating an embodiment of my invention and Fig. 2 shows curves to illustrate the operation of the apparatus shown in Fig. 1.

I have chosen to show the relay comprising my invention in the form of a photoelectric relay which is constructed to make a response when the frequency of light impulses received thereby reaches a predetermined value. The apparatus includes the photoelectric device 1, which may be a photoelectric tube, arranged to receive a light beam represented at 2 from a suitable light source 3, such as an incandescent lamp. Arranged in the path of the light beam 2 is any suitable device for producing the light impulses. By way of example I have shown such a device as the wheel 4 whose spokes intercept the light beam as the wheel rotates. At a predetermined rate of rotation of the wheel the rate of interception of the beam 2 will cause the apparatus to make a response such, for example, as by operating the signal device 5.

The impulses from the photoelectric device 1 are amplified by the two-stage amplifier comprising the capacity coupled electron discharge amplifying tubes 6 and 7 which preferable are pentodes. The input and output circuits of these tubes are supplied with unidirectional current received from the full wave rectifier 9, a suitable filter comprising the reactance 10 and the capacitors 11 being provided to smooth out the voltage variations. The rectifier 9 is connected to one of the several secondary windings of the transformer 12 whose primary may be energized from any suitable source of alternating current supply such, for example, as a 60 cycle, 110 volt lighting circuit. The amplifying system is so constructed that the second amplifying tube 7 is always operated from cut-off to saturation and thus has a constant output.

The output circuit of this tube 7 includes the resonant circuit 14 which comprises the reactor 15 and the several capacitors 16 connected together in parallel. For the purpose of effecting a coarse adjustment of the frequency at which the resonant circuit will resonate I preferably provide one or more capacitors, such as the capacitor 17, which may be connected or disconnected from the other capacitors through the switch 18. The resonant circuit 14 is so proportioned that it will resonate at approximately the same frequency as the light impulses to which the apparatus is adapted to respond and when this condition obtains a signal will be given by the lamp 5.

The means which I employ for operating the signal 5 is the grid controlled vapor electric discharge device 20 whose output circuit is supplied by rectified current from the rectifier 9. The grid of device 20 is negatively biased by the potential drop across the resistor 21 which it will be noted comprises one element of the voltage divider comprising resistors 22, 23, and 24, the grid being connected with resistor 21 through the potentiometer 25 and resistor 26. Inasmuch as the amplifying tube 7 has a substantially constant root means square output current and the impedance offered to the output circuit of this tube by the resonant circuit 14 rapidly increases when the frequency of the voltage applied thereto approaches the resonant frequency of the circuit, it will be seen that the A. C. potential change of the anode of the amplifying tube 7 will likewise rapidly increase when the frequency approaches the resonant frequency of the circuit 14. Such rise in the A. C. voltage output of the amplifying tube 7 is applied to the grid of the vapor device 20 by connecting one end of the potentiometer 25 to the anode of tube 7 through the capacitor 27 whereby when the frequency applied to the resonant circuit approaches the resonant frequency of that circuit the voltage applied to the grid of device 20 overcomes the bias applied thereto and causes the device 20 to fire or begin passing current. Various means may be employed for operating the signal lamp 5 in response to a passage of current in the output circuit of device 20. I have shown by way of example the resistor 28 in the output circuit of device 20 and across which is the winding of the relay 29 controlled by the switch 30. The secondary circuit of the relay 29 closes the circuit of the signal lamp 5 which may be supplied from any suitable source 31.

The operation of the apparatus may be more readily understood by reference to Fig. 2 where the curve 33 represents the voltage across the amplifier tube 7, the same being represented as having a frequency which steadily increases due to an acceleration of wheel 4. At a point intermediate the upper and lower frequency values represented the frequency corresponds to the resonant frequency of the resonant circuit 14 and hence the waves have a maximum amplitude. The variation in amplitude of the waves is represented by the dotted line 34 which corresponds to the resonance curve of the resonant circuit. The potentiometer 25 is so adjusted that the vapor device 20 will begin passing current only when the voltage impulses across the amplifier tube 7 reach a predetermined maximum value such, for example, as that shown by the line 35. When therefore the frequency of the light interception produced by the spokes of the wheel 4 equals the frequency corresponding to that of the point of intersection 36 of the curve 34 and the line 35, the discharge device 20 will begin passing current and operate the signal 5. By varying the position of the adjustable arm of the potentiometer 25, which has the effect of raising or lowering the line 35, one may select the point on the resonance curve 34 at which the vapor device will begin to pass current and cause the signal 5 to operate.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent in the United States is:

1. Frequency responsive relay apparatus comprising an electron discharge amplifier, means for supplying a frequency to the input circuit thereof, said amplifier having a substantially constant output, a resonant circuit in the output circuit of said amplifier, a grid controlled vapor electric discharge device and means connecting the grid circuit of said device across amplifier for selecting the point on the resonance curve of said resonant circuit at which said vapor device will begin to pass current.

2. Frequency responsive relay apparatus comprising an electron discharge ampifier, means for supplying a frequency to the input circuit thereof, said amplifier having a substantially constant output, a resonant circuit in the output circuit of said amplifier adapted to become resonant at a frequency of the order of said frequency, a grid controlled vapor electric discharge device and means including an adjustable connection for connecting the grid circuit of said device across said amplifier for varying the point on the resonance curve of said resonant circuit at which the vapor device will begin to pass current.

3. Frequency responsive relay apparatus comprising an electron discharge amplifier, means for supplying a frequency to the input circuit thereof to cause said amplifier to operate from cut off to saturation, a resonant circuit in the output circuit of said amplifier, a grid controlled vapor electric discharge device and means including a variable resistance connecting the grid circuit of said device to the output circuit of said amplifier to be responsive to the voltage thereof whereby said vapor device may be caused to begin to pass current at a selected point on the resonance curve of said resonant circuit.

4. A frequency responsive relay comprising an electron discharge amplifier adapted to be controlled by a photoelectric device and having a substantially constant output, a parallel resonant circuit connected in the output circuit of said amplifier, a vapor electric discharge device having a control grid, means for supplying a negative bias to said grid and adjustable means for supplying the voltage across said amplifier to the grid circuit of said discharge device.

5. A frequency responsive relay comprising an electron discharge amplifier adapted to be controlled by a photoelectric device and having a substantially constant output, a parallel resonant circuit connected in the output circuit of said amplifier, means for adjusting said resonant circuit to vary the frequency at which it becomes resonant, a vapor electric discharge device having a control grid and a current responsive device in its output circuit, a source of negative grid bias and a potentiometer for variably connecting the grid circuit of said device with said source of bias and with the output circuit of said amplifier to be responsive to the voltage across said amplifier.

WILLIAM D. COCKRELL.